United States Patent [19]

Okazaki

[11] Patent Number: 5,466,054
[45] Date of Patent: Nov. 14, 1995

[54] ANTI-SKID BRAKE SYSTEM WITH COEFFICIENT OF FRICTION CORRECTION

[75] Inventor: Haruki Okazaki, Hiroshima, Japan

[73] Assignee: Mazda Motor Corporation, Hiroshima, Japan

[21] Appl. No.: 228,018

[22] Filed: Apr. 15, 1994

[30] Foreign Application Priority Data

Apr. 16, 1993 [JP] Japan .................................. 5-113881

[51] Int. Cl.$^6$ ...................................................... B60T 8/58
[52] U.S. Cl. .......................... 303/150; 303/154; 303/149; 364/426.02
[58] Field of Search ..................... 303/93, 94, 96, 303/100, 103, 105, 106, 110; 364/426.02; 73/146

[56] References Cited

U.S. PATENT DOCUMENTS

| 3,734,572 | 5/1973 | Hickner et al. | 188/181 A X |
| 4,545,240 | 10/1985 | Leiber | 303/105 X |
| 4,916,619 | 4/1990 | Walenty et al. | 303/100 X |
| 5,092,662 | 3/1992 | Okubo | 303/103 X |

FOREIGN PATENT DOCUMENTS

61-222854  10/1986  Japan .

Primary Examiner—Robert J. Oberleitner
Assistant Examiner—Lee W. Young
Attorney, Agent, or Firm—Fish & Richardson

[57] ABSTRACT

An anti-skid brake system includes at least one wheel speed detecting device for detecting a rotational speed of each of a plurality of wheels separately; a ground friction coefficient estimating device for estimating a ground friction coefficient $\mu$ based on a rate of change of signals relating to the wheel speeds detected by the at least one wheel speed detecting device; a braking force adjusting device for adjusting a braking force applied to each wheel; an anti-skid control device for controlling the braking force adjusting device to prevent the wheels from being locked in accordance with the ground friction coefficient $\mu$ estimated by the ground friction coefficient estimating device; a locked wheel detecting device for detecting a number of locked wheels at least based on the wheel speeds detected by the at least one wheel speed detecting device; and an estimation process altering device for altering an estimation process for estimating the ground friction coefficient $\mu$ by the ground friction coefficient estimating device in accordance with the number of locked wheels detected by the locked wheel detecting device.

38 Claims, 5 Drawing Sheets

ANTI-SKID BRAKE SYSTEM WITH COEFFICIENT OF FRICTION CORRECTION

BACKGROUND OF THE INVENTION

1. Field of the Invention

The present invention relates to an anti-skid brake system for an automotive vehicle so adapted as to control excessive braking force at the time of braking the vehicle and, more particularly, to improvements in the technology for estimating a ground friction status of slippery ground on which the vehicle is running.

2. Description of the Related Art

As a braking system for braking an automotive vehicle, an anti-skid brake system is commercialized which can prevent wheels from locking or skidding at the time of braking.

The anti-skid brake system of this type has wheel speed sensors for sensing wheel speeds of the four wheels, an electromagnetic control valve for adjusting braking oil pressure, and a control unit for controlling the electromagnetic control valve on the basis of the wheel speeds sensed by the wheel speed sensors. The control unit is arranged such that, for example, the acceleration or deceleration of the wheels is determined on the basis of the wheel speeds of the wheels sensed by the wheel speed sensors and that the braking force is decreased by controlling the electromagnetic control valve when the deceleration is below a predetermined value (a braking force-decreasing phase), while the braking force is increased by controlling the electromagnetic control valve so as to increase its braking force when the wheel speeds of the wheels are increased by decreasing the braking force and when the acceleration reaches a predetermined value (a braking force-increasing phase).

If a series of the operations for controlling the braking force (referred to sometimes as "ABS control") is continued, for example, until the vehicle halts, it can prevent the wheels from being locked or skidding during rapid braking and the vehicle can be suspended in a short braking distance while ensuring a dimensional stability of the vehicle body.

The ABS control is usually carried out by estimating a vehicle speed from the wheel speeds, estimating a friction coefficient μ on slippery ground on which the vehicle is running on the basis of the rate of change of the vehicle speed, and correcting a threshold value for shifting the braking force between the braking-force decreasing phase and the braking-force increasing phase on the basis of the resulting ground friction coefficient. Improvements in accuracy of estimating the vehicle speed and the ground friction coefficient are extremely significant for improving the performance of the anti-skid brake control. For example, Japanese Patent Unexamined Publication Kokai No. 61-222,854 proposes that the ground friction coefficient is estimated on the basis of the maximal wheel speed out of the wheel speeds of the four wheels.

Such a conventional anti-skid brake system, however, is not structured such that the ground friction coefficient is estimated by taking account of the fact that the wheel is locked when it slips to an extent exceeding a predetermined value. As the number of the locked wheels has a close relationship with the ground friction coefficient in such a manner that the number of the locked wheels is increased when the ground friction coefficient becomes low,-while the number of the locked wheels is decreased when the ground friction coefficient becomes high. Hence, there is still room for improvements in accuracy of estimating the ground friction coefficient for such an anti-skid brake system.

SUMMARY OF THE INVENTION

One object of the present invention is to provide an anti-skid brake system for an automotive vehicle adapted so as to improve the accuracy of estimating a ground friction coefficient in the ABS control by taking into account the number of the locked wheels.

In order to achieve the object as described hereinabove, one aspect of this invention entails anti-skid brake system comprising:

- a wheel speed detecting means for detecting a rotational speed of each wheel separately;
- a ground friction coefficient estimating means for estimating a ground friction coefficient μ, i.e. a ground friction status, on the basis of a rate of change of signals relating to the wheel speed detected by the wheel speed detecting means;
- a braking oil pressure adjusting means for adjusting a braking oil pressure to be applied to each wheel;
- an anti-skid control means for controlling the braking oil pressure adjusting means so as to prevent the wheel from being locked in accordance with the ground friction coefficient μ estimated by the ground friction coefficient estimating means;
- a locked wheel detecting means for detecting the occurrence of a locked wheel at least on the basis of the wheel speed detected by the wheel speed detecting means; and
- an estimation process altering means for altering an estimation process for estimating the ground friction coefficient μ by the ground friction coefficient estimating means in accordance with the number of the locked wheels detected by the locked wheel detecting means.

The ground friction coefficient estimating means is arranged such that it is easier to alter the estimated ground friction status value to a lower ground friction side when two wheels are locked than when one wheel or no wheel is locked. Further, the ground friction coefficient estimating means is arranged such that the estimated ground friction status value is unlikely to be altered to a high ground friction value when two wheels are locked as compared with when one or no wheel is locked. In addition, the ground friction coefficient estimating means is arranged in such a fashion that the vehicle speed of the vehicle body is determined from the wheel speed of the non-locked wheel when three wheels are locked. Furthermore, when all four wheels are locked, the ground friction coefficient estimating means is so arranged as to use the previous vehicle speed as a current vehicle speed.

Other objects, features and advantages of this invention will become apparent from the description of the preferred embodiments, which follows, with reference to the accompanying drawings.

DESCRIPTION OF THE PREFERRED EMBODIMENTS

The present invention will be described in more detail by way of examples with reference to the accompanying drawings.

Figure 1:
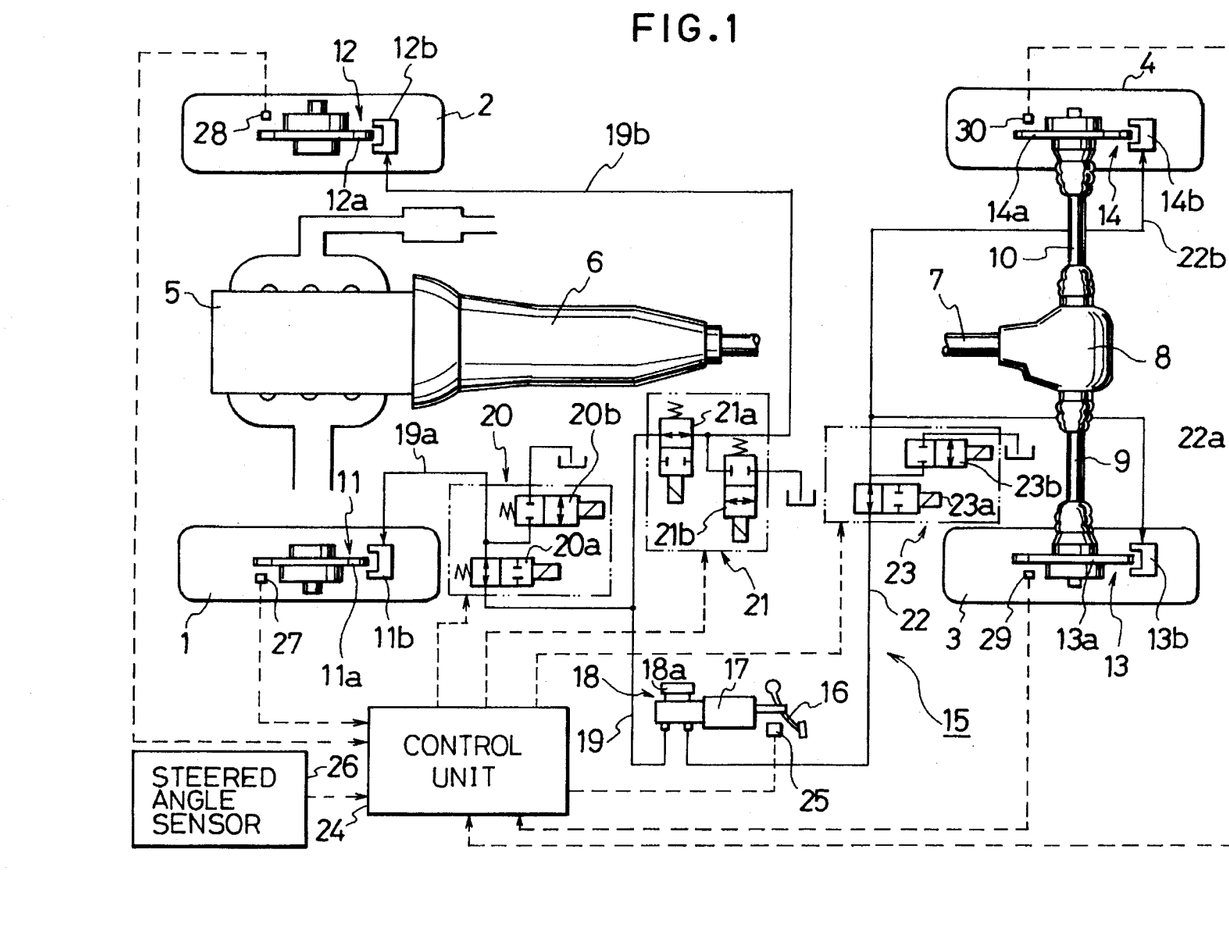
FIG. 1 is a schematic representation showing an outline of an anti-skid brake system for an automotive vehicle according to an embodiment of this invention.

As shown in FIG. 1, an automotive vehicle has left and right front wheels 1 and 2 as undriven wheels and left and right rear wheels 3 and 4 as driven wheels. The output torque of an internal combustion engine 5 is transmitted from an automatic transmission 6 through a propeller shaft 7, a differential 8 as well as left and right drive shafts 9 and 10 to the rear wheels 3 and 4, respectively.

The front wheels 1, 2 and the rear wheels 3, 4 are provided with brake units 11, 12, 13 and 14, respectively, each comprising disks 11a, 12a, 13a and 14a, each rotating integrally with the respective wheel, and calipers 11b, 12b, 13b and 14b for braking the rotation of the respective disks 11a, 12a, 13a and 14a in response to the braking pressure. The brake units 11 to 14 are operated by a brake control system 15.

The brake control system 15 comprises a servo unit 17 for increasing the force of depressing a brake pedal 16, and a master cylinder 18 for creating the braking force in accordance with the depressing force increased by the servo unit 17. The master cylinder 18 has a line 19 for supplying the braking pressure for the front wheels, which in turn branches into two branch lines 19a and 19b which in turn are communicated with the calipers 11a and 12a of the brake units 11 and 12 for the left and right front wheels 1 and 2, respectively. The branch line 19a is provided with a first valve unit 20 comprising an opening-closing valve 20a and a relief valve 20b, each being of an electromagnetic type. On the other hand, the branch line 19b is provided with a second valve unit 21 comprising an opening-closing valve 21a and a relief valve 21b, each being of an electromagnetic type, like the first valve unit 20.

On the other hand, the master cylinder 18 is communicated with another line 22 for supplying the braking pressure for the rear wheels, which in turn has a third valve unit 23 comprising an opening-closing valve 23a and a relief valve 23b, each being of an electromagnetic type, like the first valve unit 20 and the second valve unit 21.

The line 22 branches in a position downstream of the third valve unit 23 into two branch lines 22a and 22b which are connected to the calipers 13b and 14b of the brake units 13 and 14 for the left and right rear wheels 3 and 4, respectively.

The brake control system 15 is provided with a first channel for subjecting the braking pressure of the brake unit 11 for the left front wheel 1 to variable control through the first valve unit 20, a second channel for subjecting the braking pressure of the brake unit 12 for the right front wheel 2 to variable control through the second valve unit 21, and a third channel for subjecting the braking pressure of the brake units 13 and 14 for the left and right rear wheels 3 and 4 to the third valve unit 23, respectively. The first, second and third channels are controlled independently from each other.

The brake control system 15 is further provided with a control unit 24 for controlling the first, second and third channels. The control unit 24 is so arranged as to receive braking signals from a brake switch 25 for detecting an ON/OFF state of the brake pedal 16, signals indicative of a steered angle from a steered angle sensor 26 for detecting a steered angle of a steering wheel, and signals indicative of wheel speeds from wheel speed sensors 27 to 30, inclusive, for detecting the rotational speeds of the respective wheels, as well as to generate signals indicative of the control of the braking pressure to each of the first, second and third valve units 20, 21 and 22 in accordance with the signals. The brake control system 15 is arranged to control the braking against a slip of the left and right front wheels 1, 2 and the left and right rear wheels 3, 4, i.e. to perform the ABS control independently through each of the first, second and third channels.

The control unit 24 is arranged to apply the braking force to the front wheels 1, 2 and the rear wheels 3, 4 in accordance with a slipping state by controlling the opening and closing of each of the opening-closing valves 20a, 21a and 23a and the relief valves 20b, 21b and 23b of the respective first, second and third valve units 20, 21 and 23 on the basis of the wheel speeds detected by the wheel speed sensors 27 to 30.

The braking oil discharged from the relief valves 20b, 21b and 23b of the respective first, second and third valve units 20, 21 and 23 is returned to a reserve tank 18a of the master cylinder 18 through a drain line (not shown).

In a state in which no ABS control is being carried out, no signal indicative of the control of the braking pressure is generated from the control unit 24 and, as shown in the drawing, each of the relief valves 20b, 21b and 23b of the respective first, second and third valve units 20, 21 and 23 is closed while each of the opening-closing valves 20a, 21a and 23a thereof is opened. This arrangement can supply the braking pressure generated by the master cylinder 18 in proportion to the depressed force applied to the braking pedal 16 to the brake units 11 to 14 for the left and right front wheels 1 and 2 through the line 19 for supplying the braking pressure for the front wheels and to the left and right rear wheels 3 and 4 through the line 22 for supplying the braking pressure for the rear wheels, thereby applying the braking force directly to the left-and right front wheels 1 and 2 as well as to the left and right rear wheels 3 and 4, respectively, in accordance with the braking pressure.

Now, a description will be made of the way of controlling the brakes by a control unit 24.

The control unit 24 computes the deceleration DVw1 to DVw4 and acceleration AVw1 to AVw4, inclusive, for the wheels 1 to 4 on the basis of the wheel speeds Vw1 to Vw4 indicated by the wheel speed sensors 27 to 30, respectively.

The way of computing the deceleration and acceleration will be described in a manner as follows. The control unit 24 is arranged to compute the deceleration and acceleration by dividing the difference between a previous wheel speed and a current wheel speed by a sampling cycle $\Delta t$ (for example, 7 ms) and then updating a value obtained by translating the difference into gravitational acceleration as a current acceleration or deceleration.

Further, the control unit 24 executes the processing for determining if the ground on which the vehicle is running is slippery, or rough. This processing will now be described in more detail.

First, there is counted the total number of occurrences that the acceleration or deceleration of each of the wheels corresponding to each channel exceeds a predetermined threshold value over a predetermined period of time, and a decision flag Fak for deciding slippery ground is set to zero when a count is equal to or smaller than a predetermined value while the decision flag Fak is set to one when the count is larger than the predetermined value.

The control unit 24 is arranged to select the rear wheels 3 and 4 as representing the wheel speeds and the acceleration and deceleration for the third channel and further to select one of the wheel speeds of the rear wheels, whichever is lower, as the wheel speed of the rear wheel, by taking into account the fact that an error occurs in detecting the wheel speeds of the rear wheels 3 and 4 by the respective wheel speed sensors 29 and 30 at the time when the vehicle slips. Then, the acceleration and the deceleration are computed on the basis of the selected wheel speed of the rear wheel and the resulting acceleration and deceleration are selected as the acceleration and deceleration for the rear wheels.

In addition, the control unit 24 computes a virtual vehicle speed Vr in every very short predetermined period, which is common in all three channels. From this virtual vehicle speed Vr, a ground friction status value (a value indicative of the status of ground friction) Mu corresponding to an estimated ground friction value is computed. When the ground friction is low, the ground friction status value Mu is set to 1; when the ground friction is medium, the ground friction status value Mu is set to 2; and when the ground friction is high, the ground friction status value is set to 3. This will be described in more detail hereinafter.

The control unit 24 computes a slip ratio for each of the first, second and third channels from the wheel speed of the rear wheels determined from the signals from the wheel speed sensors 29 and 30, the wheel speed of each of the left and right front wheels 1 and 2 detected by the respective wheel speed sensors 27 and 28, and the vehicle speed Vr. The slip ratio is computed by the following formula:

Slip Ratio=(Wheel Speed)/(Virtual Vehicle Speed)×100

As is apparent from the formula above, the slip ratio becomes smaller as a deviation of the wheel speed with respect to the virtual vehicle speed Vr, leading to an increase in the tendency that the vehicle becomes likely to slip.

Thereafter, the control unit 24 sets various control threshold values to be employed for controlling the first, second and third channels and then uses the control threshold values for executing the decision processing for deciding whether the wheel is locked, the phase decision processing for deciding a phase for defining a control amount for each of the first, second and third valve units 20, 21 and 23, and the cascade decision processing.

First, a description will be made of the processing for each channel for deciding to determine if the wheel is locked, for example, by taking the first channel for the left front wheel 1 as an example.

In the processing for deciding the locking of the left front wheel 1, the control unit 24 first sets the current value of a continuation flag Fcn1 for the first channel as a previous value, followed by making a decision to determine if the vehicle speed Vr and the wheel speed Vw1 of the left front wheel 1 satisfy pre-determined conditions (for example, Vr<5 km per hour and Vw1<7.5 km per hour). When it is decided that they satisfy the predetermined conditions, the continuation flag Fcn1 and a locking flag Flok1 are reset to zero. On the other hand, when it is decided that they fail to satisfy the predetermined conditions, it is further decided to determine if the locking flag Flok1 is set to one.

If the locking flag Flok1 is not set to one, it is set to one when a predetermined condition (for example, deceleration of the wheel being −3G) is satisfied.

On the other hand, for example, the control unit 24 sets a phase flag P1 for the first channel to 5 indicative of a phase V and the continuation flag Fcn1 to one when a slip ratio S1 is greater than a 5-1 slip ratio threshold value Bsz for shifting the phase 5 to phase 1. The processing for deciding the locking is executed in substantially the same manner for the second and third channels.

Now, the processing for deciding the phase will be described in a manner as will be described hereinafter. In the processing for deciding the phase, the control unit 24 is arranged to compare the control threshold values set in accordance with the running status of the vehicle with the acceleration or deceleration and the slip ratio and, as a consequence, to select a phase O indicative of the state in which no ABS control is in process, a phase I indicative of the state of increasing the braking pressure during the ABS control, a phase II indicative of the state in which the increased braking pressure is retained, a phase III indicative of the state in which the braking pressure is decreased, a phase IV indicative of the state in which the braking pressure is decreased rapidly, and a phase V indicative of the state in which the decreased braking pressure is retained.

In addition, the cascade decision processing is arranged to decide a cascade lock state in which the locked state of the wheel occurs in succession over a short period of time because the wheel is very likely to be locked even with a small braking pressure on ground having a low ground friction coefficient, particularly on frozen ground. When a predetermined condition likely to cause such a cascade lock state is satisfied, a cascade flag Fcs is set to one.

In the manner as described hereinabove, the control unit 24 generates signals indicative of the braking pressure control to the first, second and third valve units 20, 21 and 23, which correspond to the phase specified by the phase flag P1 for each channel. In response to the signals, the braking pressure of the branch lines 19a and 19b for supplying the braking pressure for the front wheels and the branch lines 22a and 22b for supplying the braking pressure for the rear wheels on the side downstream of the first, second and third valve units 20, 21 and 23 is increased or decreased or retained at a pressure level after the braking pressure has been increased or decreased.

Then, the operation processing for computing the vehicle speed Vr and the ground friction status value Mu will be described with reference to FIGS. 2 and 3.

This operation processing is the processing always executed when the vehicle is running. After the operation processing has been started, various data necessary for the operation processing is read at step S1, which include data of the signals detected by the wheel speed sensors and signals stored in memory. Then, at step S2, it is decided to determine if the vehicle is in process of ABS control. It is decided that the vehicle is in process of ABS control when one of the locking flags Flok1, Flok2 and Flok3 is set to 1, followed by proceeding to step S3.

Then, at step S3, the wheel speeds Vw1, Vw2, Vw3 and Vw4 of the left and right front wheels 1 and 2 and the left and right rear wheels 3 and 4 are computed on the basis of the data of the wheel speeds detected by the wheel speed sensors 27, 28, 29 and 30, respectively, followed by proceeding to step S4 at which it is decided if all of the four wheels are locked. When the result of this decision indicates that the four wheels are locked, then the program flow goes to step S11. On the other hand, when the result of decision at step S4 is No, then the program flow goes to step S5 at which it is determined if three wheels are locked. When the decision at step S5 gives the affirmative result, then the program flow goes to step S12. On the other hand, when the result of the decision at step S5 indicates that three wheels are not locked, then the program flow goes to step S6.

In this specification, the state in which a wheel is locked is intended to mean the state in which the difference obtained by subtracting the wheel speed from the vehicle speed Vr is equal to or smaller than 0.5 km per hour. It should be noted herein that, as the vehicle speed Vr referred to herein is unknown, the previous vehicle speed stored in memory is employed as the vehicle speed Vr in deciding whether the wheel is locked.

At step S6, it is shown that there are two or more wheels which are locked, and the maximal wheel speed VwM and the second maximal wheel speed Vwm are computed. Then, at step S7, it is decided if the maximal wheel speed VwM is equal to or greater than a predetermined value V0 (for example, V0=70 km per hour). When the decision indicates that the maximal wheel speed VmM is equal to or greater than the predetermined value V0, it is decided that the vehicle is running at a high speed, followed by proceeding to step S8. On the other hand, when the result of decision at step S7 indicates that the maximal wheel speed VmM is smaller than the predetermined value V0, it is decided that the vehicle is not running at a high speed, followed by proceeding to step S9.

At step S8, a coefficient k to be employed at step S10 is set to a predetermined value a (wherein α is in the range of 0–0.2). On the other hand, at step S9, a coefficient k is set to a predetermined value β (wherein βis in the range of 0.8–1.0). Then, at step S10, the vehicle speed Vr is computed by the following formula:

$$Vr=(1-k) \times VwM + k \times Vwm$$

This vehicle speed Vr is stored together with the plural previous vehicle speeds in a memory, followed by proceeding to step S13.

On the other hand, when it is decided at step S4 that all the four wheels are locked, then the program flow goes to step S11 at which the previous vehicle speed Vr is set as the current vehicle speed Vr, followed by proceeding to step S13.

Further, when it is decided at step S5 that the three wheels are locked, then the program flow goes to step S12 at which the vehicle speed Vwi (wherein i=1, 2, 3 or 4) of the non-locked wheel is set as the vehicle speed Vr, followed by proceeding to step S13.

Then at step S13, it is further decided if the total number of the locked wheels is two. When the result of decision indicates that the two wheels are locked, then the program flow goes to step S14 at which a flag F2 is set to one, followed by proceeding to step S16. On the other hand, when it is decided that the total number of the locked wheels is not two, then the program flow goes to step S15 at which the flag F2 is set to zero, followed by proceeding to step S16.

Then, at step S16, a change rate DVr of the vehicle speeds is computed as a value obtained by differentiating the plural previous vehicle speeds Vr with time t (dVr/dt), followed by proceeding to step S17 at which it is decided if the change rate DVr is equal to or greater than −0.6G. When it is decided that the change rate DVr is equal to or greater than −0.6G, then it is further decided at step S18 to determine if the flag F2 is set to 1, i.e. if the total number of the locked wheels is two.

When the result of the decision at step S18 indicates that the flag F2 is set to one, then the program flow goes to step S19 at which it is decided that the ground friction coefficient μ is low and the ground friction status value Mu is set to Mu=1, followed by the return of the program. On the other hand, when it is decided at step S18 that the flag F2 is not set to one, then the program flow goes to step S20 at which decision is further made to determine if the previous ground friction status value Mu has been set to Mu=1. When the result of decision at step S20 gives the result that the previous ground friction status value Mu is one, then the program flow goes to step S19 and the ground friction status value Mu is set to one. On the other hand, when it is decided at step S20 that the previous ground friction status value Mu is not Mu=1, then the program flow returns without passage at step S19.

When the two wheels are locked, there is the possibility the ground friction coefficient μ is low because the acceleration or deceleration is small regardless of the application of a sufficient magnitude of the braking force. Hence, when the result of decision at step S18 indicates that the two wheels are locked, then the program flow goes to step S19 and the ground friction status value Mu is set to Mu=1, in order to make the ground friction status value Mu likely to be changed to a low ground friction side.

On the other hand, when only one wheel is locked or when no wheels are locked, there is the low possibility that the ground friction coefficient μ is low so that the ground friction status value Mu is set to Mu=1 at step S19 on condition that the previous ground friction status value Mu is Mu=1 (low μ).

Further, when it is decided at step S17 that the change rate DVr is smaller than −0.6G, then the program flow goes to step S21 at which decision is further made to determine if the change rate DVr is smaller than −0.6G yet it is equal to or greater than −1.0G. When this decision gives the affirmative result, then the program flow goes to step S22 at which the ground friction status value Mu is set to Mu=2 because it is decided that the ground friction coefficient μ is medium, followed by the return of the program.

On the other hand, if the result of the decision at step S21 gives the negative result, then the program flow goes to step S23 at which it is further decided if the flag F2 is set to one, i.e. if the number of the locked wheels is two. When this decision gives the result that the flag F2 is not set to one, then the program flow goes to step S25 at which the ground friction status value Mu is set to Mu=3 because it is decided that the ground friction coefficient μ is high. On the other hand, when the result of decision at step S23 indicates that the flag F2 is set to one, it is further decided at step S24 to determine if the previous ground friction status value Mu is set to Mu=3. When this decision gives the affirmative result, then the program flow goes to step S25. On the other hand, when the result of the decision at step S24 gives the negative result, then the program flow returns without passage through step S25.

When wheel no or only one wheel is locked even if the ABS control is in process and the braking pedal is depressed with the sufficient magnitude of the force, there is the high possibility that the vehicle is in an "underbraking" state as a result of the decrease in the braking pressure by the ABS control and further that the ground friction status is a high ground friction coefficient μ because the deceleration is high. Hence, when the result of decision at step S23 indicates that the flag F2 is not set to one, the ground friction status value Mu is set to Mu=3 at step S25, in order to make the ground friction status value Mu likely to be altered to a high ground friction side.

Further, when two wheels are locked, the possibility is low that the ground friction coefficient μ is high. In this case, the ground friction status value Mu is set to Mu=3 at step S25 on condition that the previous ground friction status value Mu is Mu=3 (a high ground friction coefficient μ), followed by the return of the program. After the program flow returns from steps S19, S20, S22, S24 and S25, the vehicle speed Vr is continually detected in every very short time in the manner as described hereinabove.

Figure 4:
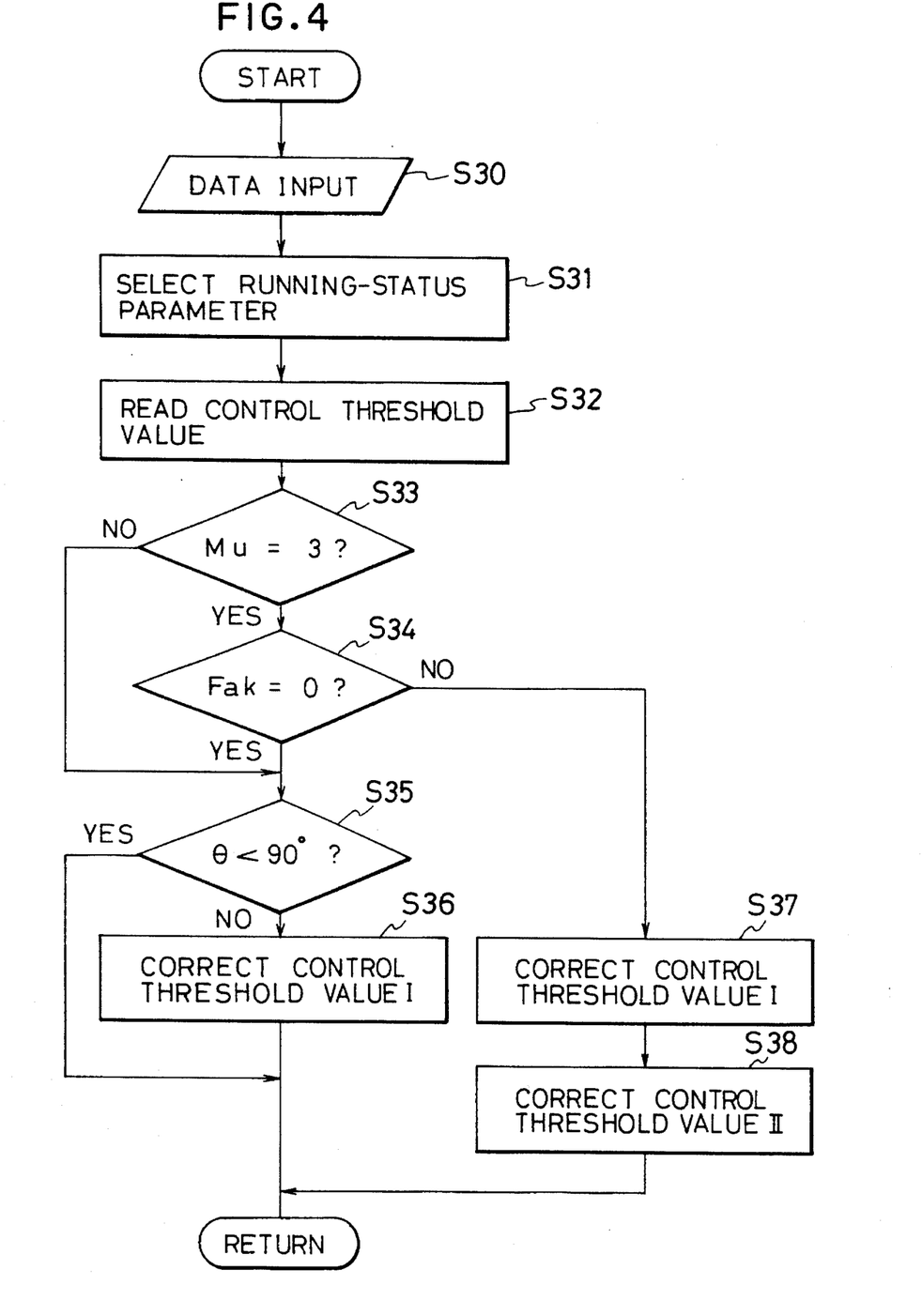
FIG. 4 is a flowchart for the processing in setting a control threshold value.

Now, a description will be made of the processing for setting a variety of the control threshold values for determining the phases of the ABS control with reference to FIG. 4. This processing is executed for each channel independently from each other. In this description, this processing is described by taking the first channel for the left front wheel as an example for brevity of explanation.

The control unit 24 reads various data at step S30, followed by proceeding to step S31 at which a running-status parameter is selected in accordance with the ground friction status value Mu and the vehicle speed Vr from Table 1 set by using the speed range of the vehicle speed Vr and the ground friction status value Mu as parameters, as indicated below.

TABLE 1

| Fak | Mu | Vehicle Speed Vr | Running-Status Parameter |
|---|---|---|---|
| 1 | — | High Speed Range | HM 1 |
|   |   | Medium Speed Range | HM 2 |
|   |   | Low Speed Range | HM 3 |
| 0 | 3 | High Speed Range | HM 1 |
|   |   | Medium Speed Range | HM 2 |
|   |   | Low Speed Range | HM 3 |
|   | 2 | High Speed Range | MM 1 |
|   |   | Medium Speed Range | MM 2 |
|   |   | Low Speed Range | MM 3 |
|   | 1 | High Speed Range | LM 1 |
|   |   | Medium Speed Range | LM 2 |
|   |   | Low Speed Range | LM 3 |

For example, when the ground friction status value Mu is set to Mu-1 indicative of a low ground friction coefficient μ and the vehicle speed Vr is in a medium speed range, a parameter "LM 2" for low ground friction coefficient and medium speed is selected as a running-status parameter. In the table 1 above, Mu=1 indicates a low friction status; Mu=2 indicates a medium friction status; and Mu=3 indicates a high friction status.

On the other hand, when the decision flag Fak is set to one indicative of slippery ground, the running-status parameter is selected in accordance with the vehicle speed Vr only. For example, when the vehicle speed Vr exists in the medium speed range, a parameter "HM 2" for low ground friction coefficient and medium vehicle speed is selected because there is the tendency that the ground friction coefficient μ is estimated as a low ground friction coefficient μ because the wheel speeds vary to a great extent during running on slippery ground.

After the selection of the running-status parameter, at step S32, the control unit 24 reads various control threshold values corresponding to the running-status parameter from Table 2 for setting control threshold values, as shown below.

TABLE 2

| RUNNING-STATUS PARAMETER | B12 | Bsg | B35 | Bsz |
|---|---|---|---|---|
| HM 1 | −1.5 G | 95% | 0G | 95% |
| HM 2 | −1.5 G | 90% | 0G | 90% |
| HM 3 | −1.5 G | 85% | 0G | 85% |
| MM 1 | −1.0 G | 95% | 0G | 95% |
| MM 2 | −1.0 G | 90% | 0G | 90% |
| MM 3 | −1.0 G | 85% | 0G | 85% |
| LM 1 | −0.5 G | 95% | 0G | 95% |
| LM 2 | −0.5 G | 90% | 0G | 90% |
| LM 3 | −0.5 G | 85% | 0G | 85% |

As shown in Table 2 above, there are set, as control threshold values, a 1–2 medium deceleration threshold value B12 for deciding a shift from phase I to phase II, a 2–3 medium slip ratio threshold value Bsg for deciding a shift from phase II to phase III, a 3–5 medium deceleration threshold value B35 for deciding a shift from phase III to phase V, and a 5-1 slip ratio threshold value Bsz for deciding a shift from phase V to phase I.

The deceleration threshold value that greatly exerts the braking force is set so as to come closer to 0G as the ground friction status value Mu become smaller, i.e. as the ground friction coefficient μ becomes smaller, in order to highly improve the braking performance when the ground friction coefficient μ is high and responsiveness to the control when the ground friction coefficient μ is low. Hence, for example, when the parameter "LM 2" for medium vehicle speed and low ground friction coefficient is selected as the running-status parameter, the control unit 24 reads −0.5G as the 1–2 medium deceleration threshold value B12, 90% as the 2–3 medium slip ratio threshold value Bsg, 0G as the 3–5 medium deceleration threshold value B35, and 90% as the 5-1 slip ratio threshold value Bsz from Table 2 above.

Thereafter, at step S33, the control unit 24 decides if the ground friction status value Mu is set to Mu=3 indicative of a high ground friction coefficient μ. When this decision indicates that the ground friction status value Mu is set to Mu=3, it is further decided at step S34 to determine if the flag Fak is set to zero. When this decision gives the result that the flag Fak is set to zero, then the program flow goes to step S35 at which it is decided to determine if the absolute value of a steered angle θ detected by the steered angle sensor 26 is smaller than 90°. When it is decided at step S35 that the absolute value of the steered angle is equal to or larger than 90°, the control threshold value is corrected at step S36 in accordance with the steered angle θ, followed by the return of the program. This correction processing for correcting the control threshold value I is executed at step S36 on the basis of Table 3 for correcting control threshold values, as indicated below.

TABLE 3

| Mu | Fak | Steered Angle θ | B12 | Bsg | B35 | Bsz |
|---|---|---|---|---|---|---|
| 1, 2 | — | <90° | B12 | Bsg | B35 | Bsz |
|   |   | ≧90° | B12 | Bsg + 5% | B35 | Bsz + 5% |
| 3 | 0 | <90° | B12 | Bsg | B35 | Bsz |
|   |   | ≧90° | B12 | Bsg + 5% | B35 | Bsz + 5% |
|   | 1 | <90° | B12-1.0 G | Bsg − 5% | B35 | Bsz − 5% |
|   |   | <90° | B12-1.0 G | Bsg | B35 | Bsz |

In Table 3 for correcting the control threshold values, the values obtained by adding 5% to each of the 2–3 medium slip ratio threshold value Bsg and the 5-1 medium slip ratio threshold value Bsz are set as the final 2–3 medium slip ratio threshold value Bsg and the final 5-1 medium slip ratio threshold value Bsz, respectively, in order to ensure maneuverability when the steering wheel is steered at a great angle when the ground friction coefficient μ is low, medium and high (non-slippery ground). The other medium threshold values are set intact as the final threshold values.

On the other hand, when the ground has a high ground friction coefficient and it is slippery (when flag Fak is set to one), the values obtained by subtracting 5% from each of the 2–3 medium slip ratio threshold value Bsg and the 5-1 medium slip ratio threshold value Bsz are set as the final 2–3 medium slip ratio threshold value Bsg and the final 5-1 medium slip ratio threshold value Bsz, respectively, in order to ensure running performance when the steering wheel is steered at a small angle.

When it is decided at step S35 that the absolute value of the steered angle is smaller than 90°, each of the medium values is set intact as the final threshold value.

On the other hand, when it is decided at step S34 that the flag Fak is set to one, then the program flow goes to step S37 at which the control unit 24 executes the correction processing for correcting the control threshold value I by setting the values obtained by correcting the 2–3 medium slip ratio threshold value Bsg and the 5-1 medium slip ratio threshold value Bsz in association with the flag Fak and the steered angle θ on the basis of Table 3 above and by setting the corrected values as the final 2–3 medium slip ratio threshold value Bsg and the final 5-1 medium slip ratio threshold value Bsz. Then, at step S38, the correction processing for correcting the control threshold value II is executed by subtracting 1.0G from the 1–2 medium deceleration threshold value B12 and setting the resulting corrected value as the final 1–2 medium deceleration threshold value B12. After step S38, the program flow is returned.

The correction processing is so adapted as to ensure an appropriate magnitude of the braking force by delaying responsiveness to the control in deciding whether ground is slippery, because the wheel speed sensors 27 to 30 are likely to cause an error in detecting the respective wheel speeds. It is to be noted herein that the other medium threshold values are set intact as the final threshold values. Furthermore, when the control unit 24 makes decision at step S33 that the ground friction status value Mu is not set to Mu=3, then the program flow goes to step S35.

It should be further noted herein that the control threshold values for the second and third channels can be set in substantially the same manner as the control threshold values for the first channel.

Figure 5:
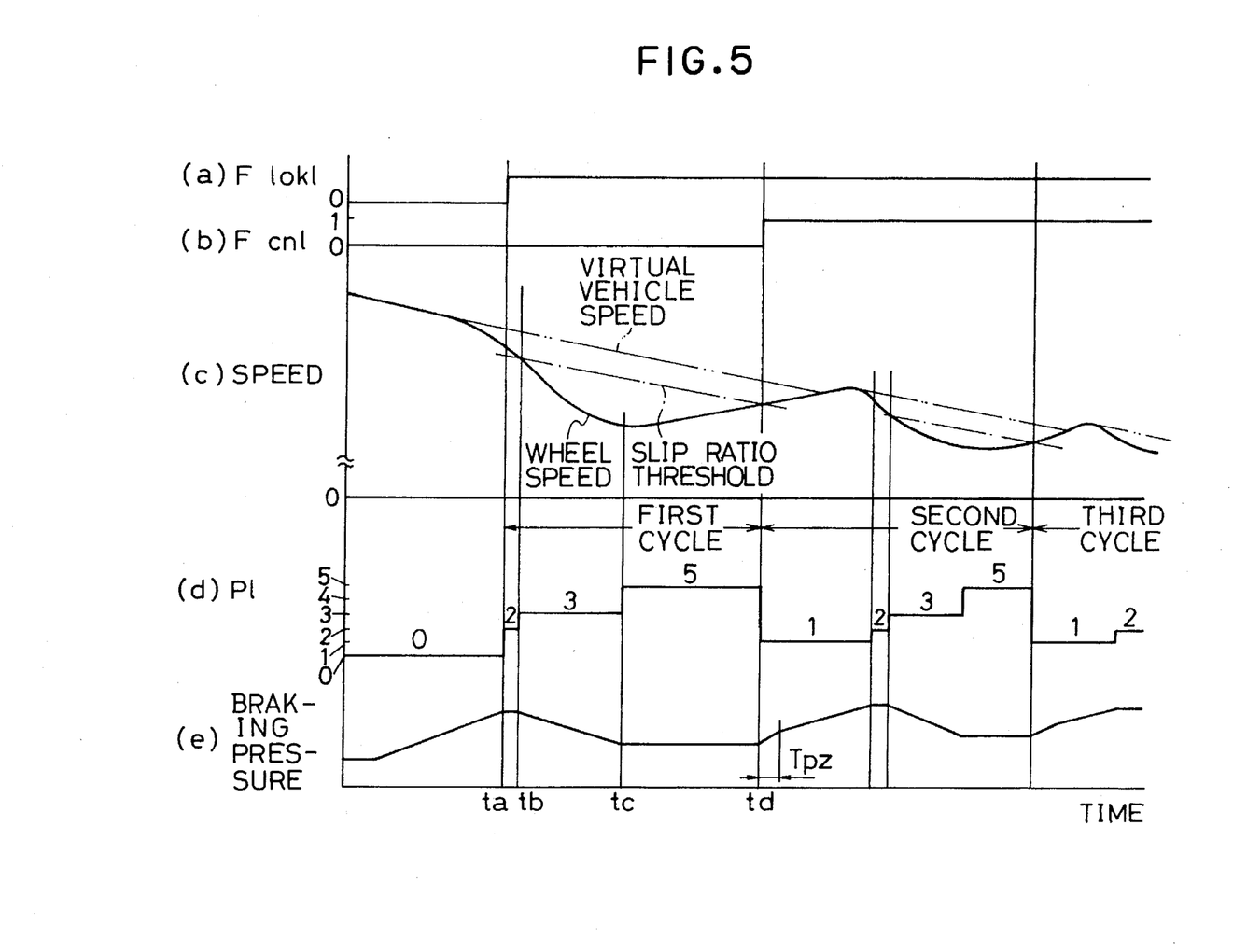
FIG. 5 is a timing chart showing operations of the anti-skid brake system according to one embodiment of this invention.

Now, a description will be made of the action of the ABS control as described hereinabove with reference to FIG. 5, by taking the ABS control for the first channel as an example. In FIG. 5, Pi indicates the phase in which the phase I is indicated by 1, the phase II by 2, the phase III by 3, the phase IV by 4, and the phase V by 5.

When no ABS control is being carried out during deceleration, the braking pressure created by depressing the braking pedal 26 is gradually increased and, when the change rate (deceleration DVw1) of the wheel speed Vw1 of the left front wheel 1 reaches −3G, the locking flag Flok1 for the first channel is set to one and the ABS control starts at this time ta at which the phase O was shifted to the phase II.

In the first cycle immediately after the start of the ABS control, the ground friction status value Mu is set to Mu=3 indicative of a high ground friction status and the various control threshold values are set in accordance with the running-status parameter.

Then, the various control threshold values are compared with the slip ratio S1, the wheel deceleration DVw1, and the wheel acceleration AVw1, each being computed from the wheel speed Vw1, and the phase O is shifted to the phase II and the braking force is maintained at the level right after the braking pressure has been increased.

When the slip ratio S1 is decreased below the 23 medium slip ratio threshold value Bsg, the phase II is shifted to the phase III and the relief valve 20b is turned on or off at its predetermined opening-closing mode. From the time tb at which the phase II was shifted to the phase III, the braking pressure is decreased at a predetermined gradient, resulting in lowering the braking force gradually and recovering the rotational force of the left front wheel 1. When the braking pressure is continued decreasing and the wheel deceleration DVw1 is decreased up to the threshold value B35 (0G), the phase III is shifted to the phase V. From the time tc at which the phase III was shifted to the phase V, the braking pressure is held at the level to which the braking pressure has been decreased.

In the phase V, when the slip ratio S1 reaches the level equal to or greater than the 5-1 medium slip ratio threshold value Bsz, the continuation flag Fcn1 is set to one and the ABS control is shifted to the second cycle at the time td. Immediately after the shift to the phase I at the time td, the opening-closing valve 20a is opened at the duty ratio of 100%, in the state in which the relief valve 20b is closed, over the period of time Tpz during which the braking pressure is being increased rapidly, which time Tpz being set by using the previous time T, as a parameter, during which the braking pressure has previously been increased. The opening of the opening-closing valve 20a increases the braking pressure at a steep gradient during the time Tpz and then the opening-closing valve 20a is turned on or off at a predetermined duty ratio, thereafter raising the braking pressure gradually at a moderate gradient. This arrangement can increase the braking pressure with certainty immediately after the shift to the second cycle and ensure a favorable level of the braking pressure thereafter.

After the second cycle, an appropriate ground friction status value Mu is determined in the same manner as in the second cycle and various control threshold values corresponding to the running-status parameter in accordance with the ground friction status value Mu and the vehicle speed Vr are selected from Table 2 above. This allows the braking pressure to be controlled with high accuracy in accordance with the running status of the vehicle even after the second cycle.

In the phase V in the second cycle, for example, when the slip ratio S1 is decided as being greater than the threshold value Bsz, the phase V in the second cycle is shifted to the phase I in the third cycle. This can be applied to the cycles after the third cycle.

Figure 2:
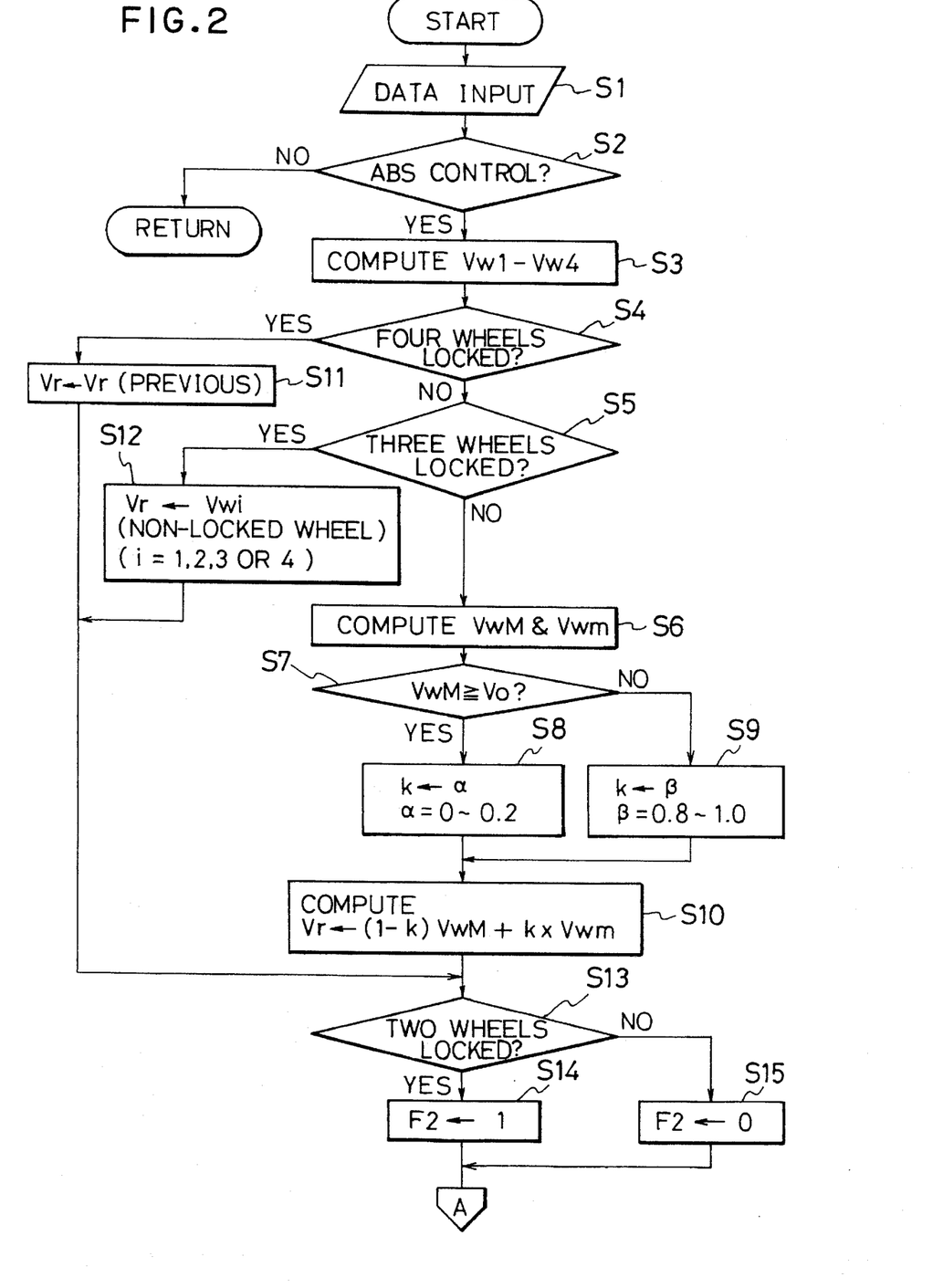
FIG. 2 is a portion of a flowchart for the operation processing for a vehicle speed Vr and a ground friction status value Mu.

In the ABS control according to the embodiment of this invention, the vehicle speed Vr is computed with the maximal wheel speed VmM increased by a predetermined increment and with the second maximal wheel speed Vwm decreased by a predetermined decrement, as indicated at steps S7 to S10 in FIG. 2, when the vehicle is running at a high speed. This allows the duration of each cycle of the ABS control to be elongated, thereby enabling the anti-skid control to be performed with high stability in running.

On the other hand, when the vehicle is running at a low speed, the vehicle speed Vr is determined with the maximal wheel speed VmM decreased by a predetermined decrement and with the second maximal wheel speed Vwm increased by a predetermined increment. Hence, this arrangement can shorten the duration of each cycle of the ABS control, thereby enabling the anti-skid control to be carried out with high braking performance.

The arrangement of the system according to the embodiment of this invention can compute the vehicle speed Vr with high certainty even if all the four wheels are locked because the previous vehicle speed Vr can be employed as the current vehicle speed Vr, as indicated at steps S4 and S11 in FIG. 2.

The system according to the embodiment of this invention can further compute the vehicle speed Vr with certainty even if three wheels are locked because the wheel speed of the non-locked wheel is employed as the vehicle speed Vr, as indicated at steps S5 and S11 in FIG. 2.

Figure 3:
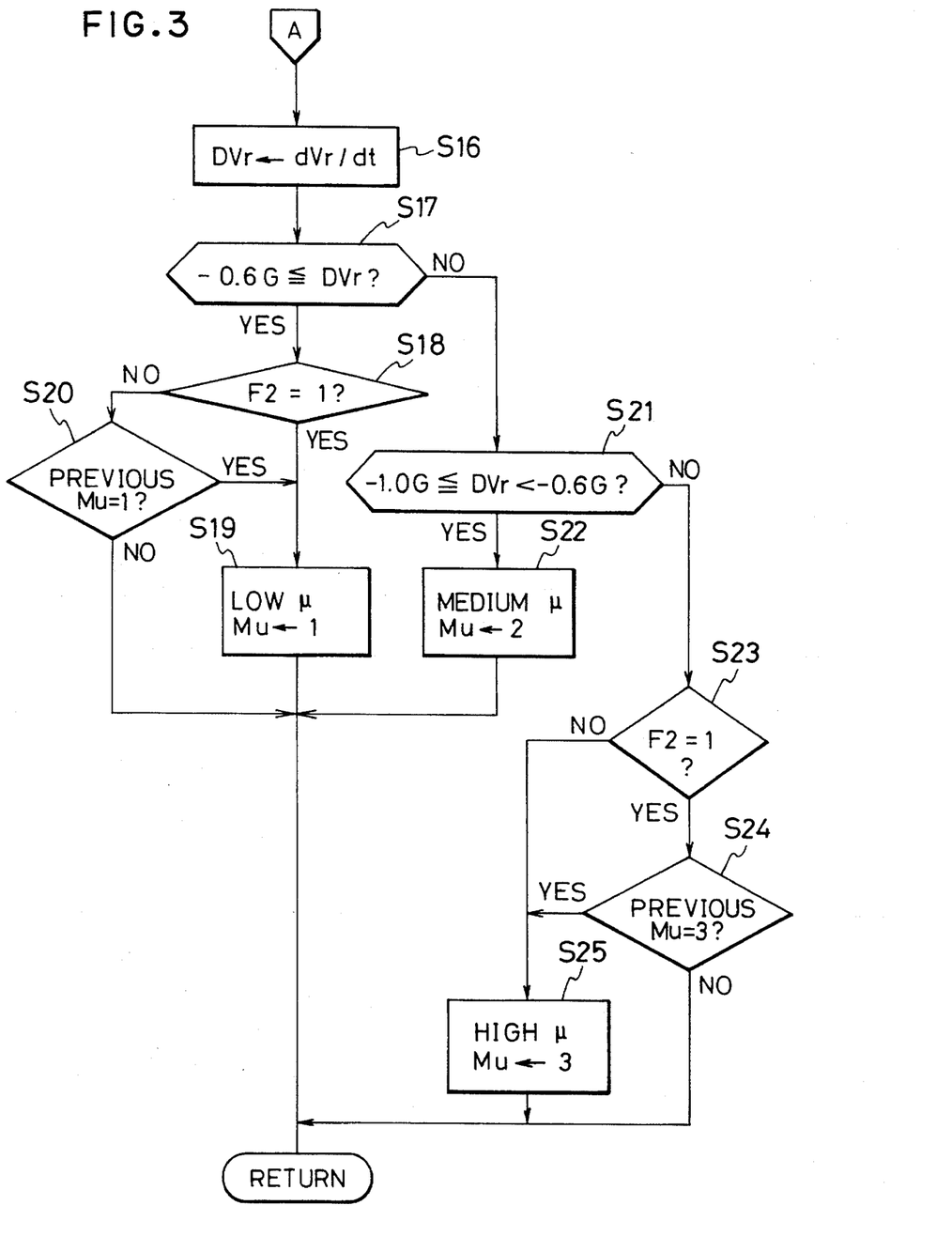
FIG. 3 is the rest of a flowchart for the operation processing for the vehicle speed Vr and the ground friction status value Mu.

Further, even when two wheels are locked, the system according to the embodiment of this invention can improve the accuracy of estimation of the ground friction status value Mu because the ground friction status value Mu is arranged likely to be shifted to a low friction side, as indicated at steps S13–S15 in FIG. 2 and S19–S20 in FIG. 3.

In addition, even when only one wheel is locked, the system according to the embodiment of this invention can improve the accuracy of estimation of the ground friction status value Mu because the ground friction status value Mu is arranged likely to be shifted to a high friction side, as indicated at steps S13–S15 in FIG. 2 and S23–S25 in FIG. 3.

It is to be understood that this invention is not restricted to those embodiments as described hereinabove and that it encompasses modifications and variations within the spirit and the scope of this invention. Such modifications and variations include the following modes:

1. An oil pressure sensor is mounted for detecting the original pressure of braking oil pressure in such a manner that the coefficient k at step S10 is set to a range from 0 up to ca. 0.2 when the original pressure is high; the coefficient k to a range from ca. 0.7 to ca. 1.0 when the original pressure is medium; and the coefficient k to a range from 0 up to ca. 0.2 when the original pressure is low.

2. In the brake control system according to the embodiment of this invention, a three-channel system is arranged so as to control the first, second and third channels independently from each other. The system may be arranged to control each of the four wheels by a discrete channel independently from each other.

3. The brake control system according to the embodiment of this invention is arranged such that the ABS control is performed by repeating a cycle of four phases which consist of the phase for increasing the braking pressure, the phase for holding the braking pressure at the increased level, the phase for decreasing the braking pressure, and the phase for holding the braking pressure at the decreased level. It is also possible to set each cycle so as to comprise two phases, i.e. a phase for increasing the braking pressure and a phase for decreasing the braking pressure.

What is claimed is:

1. An anti-skid brake system comprising:

at least one wheel speed detecting means for detecting a rotational speed of each of a plurality of wheels separately;

a ground friction coefficient estimating means for estimating a ground friction coefficient μ based on a rate of change of signals relating to the wheel speeds detected by said at least one wheel speed detecting means;

a braking force adjusting means for adjusting a braking force applied to each wheel;

an anti-skid control means for controlling said braking force adjusting means to prevent the wheels from being locked in accordance with the ground friction coefficient μ estimated by said ground friction coefficient estimating means;

a locked wheel detecting means for detecting a number of locked wheels at least based on the wheel speeds detected by said at least one wheel speed detecting means; and an estimation process altering means for altering an estimation process for estimating the ground friction coefficient μ by said ground friction coefficient estimating means in accordance with the number of the locked wheels detected by said locked wheel detecting means.

2. The anti-skid brake system as claimed in claim 1, wherein said estimation process is altered such that the ground friction status is more likely to be shifted to a low ground friction side when (i) the number of locked wheels detected by said locked wheel detecting means is two, than when (ii) the number of the locked wheels is less than two.

3. The anti-skid brake system as claimed in claim 1, wherein said estimation process is altered such that the ground friction status is more likely to be shifted to a high ground friction side when (i) the number of locked wheels detected by said locked wheel detecting means is two, than when (ii) the number of the locked wheels is less than two.

4. The anti-skid brake system as claimed in claim 1, wherein said ground friction coefficient estimating means comprises:

a vehicle speed estimating means for estimating a vehicle speed based on the wheel speeds detected by said at least one wheel speed estimating means;

a change-rate computing means for computing a change rate of the vehicle speed estimated by said vehicle speed estimating means; and a ground friction coefficient determining means for determining the ground friction coefficient μ based on the change rate of the vehicles speed computed by said change-rate computing means.

5. The anti-skid brake system as claimed in claim 4, wherein said estimation process altering means alters the ground friction coefficient μ determined by said ground friction coefficient determining means in accordance with the number of the locked wheels detected by said locked-wheel detecting means even if the change rate computed by said change-rate computing means remains the same.

6. The anti-skid brake system as claimed in claim 5, wherein, when the deceleration of the vehicle speed computed by said change-rate computing means is small, said ground friction coefficient determining means determines the ground friction coefficient μ as a lowest ground friction coefficient μ when the number of the locked wheels detected by said locked-wheel detecting means is two; and said ground friction coefficient determining means determines the ground friction coefficient μ determined previously by said ground friction coefficient determining means as a lowest ground friction coefficient μ when the number of the locked wheels detected by said locked-wheel detecting means is less than two.

7. The anti-skid brake system as claimed in claim 5, wherein, when the deceleration of the vehicle speed computed by said change-rate computing means is high;

said ground friction coefficient determining means determines the ground friction coefficient μ as a highest ground friction coefficient μ when the number of the locked wheels detected by said locked-wheel detecting means is less than two; and said ground friction coefficient determining means determines the ground friction coefficient $\mu$ determined previously by said ground friction coefficient determining means as a highest ground friction coefficient $\mu$ when the number of the locked wheels detected by said locked-wheel detecting means is two.

8. The anti-skid brake system as claimed in claim 5, wherein:

the deceleration of the vehicle speed is set as a first predetermined value and a second predetermined value is set as a value greater in the deceleration of the vehicle speed than the first predetermined value;

the ground friction coefficient $\mu$ comprises a low ground friction coefficient $\mu$, a medium ground friction coefficient $\mu$ and a high ground friction coefficient $\mu$;

when the deceleration of the vehicle speed computed by said change-rate computing means is smaller than the first predetermined value, said ground friction coefficient determining means and said estimation process altering means determine the ground friction coefficient $\mu$ as a low ground friction coefficient $\mu$ when the number of the locked wheels detected by said locked-wheel detecting means is two and said ground friction coefficient determining means and said estimation-process altering means determine the ground friction coefficient $\mu$ as a low ground friction coefficient $\mu$ on a condition that the previous ground friction coefficient $\mu$ is determined as a low ground friction coefficient $\mu$, when the number of the locked wheels detected by said locked-wheel detecting means is less than two;

when the deceleration of the vehicle speed computed by said change-rate computing means is greater than the second predetermined value, said ground friction coefficient determining means and said estimation-process altering means determine the ground friction coefficient $\mu$ as a high ground friction coefficient $\mu$ when the number of the locked wheels detected by said locked-wheel detecting means is less than two and said ground friction coefficient determining means and said estimation-process altering means determine the ground friction coefficient $\mu$ as a high ground friction coefficient $\mu$ on a condition that the previous ground friction coefficient $\mu$ is determined as a high ground friction coefficient $\mu$, when the number of the locked wheels detected by said locked-wheel detecting means is two; and when the deceleration of the vehicle speed computed by said change-rate computing means exists between the first and second predetermined values, said ground friction coefficient determining means and said estimation-process altering means determine the ground friction coefficient $\mu$ as a medium ground friction coefficient $\mu$.

9. The anti-skid brake system as claimed in claim 4, wherein:

the number of the locked wheels is detected by said locked-wheel detecting means based on the vehicle speed estimated by said vehicle speed estimating means and the wheel speeds detected by said at least on a wheel speed detecting means; and a probability that the number of the locked wheels is detected increases as the wheel speed or the vehicle speed becomes higher.

10. The anti-skid brake system as claimed in claim 9, wherein said vehicle speed estimating means estimates a vehicle speed from a rotational speed of a non-locked wheel when the number of the locked wheels detected by said locked-wheel detecting means is three.

11. The anti-skid brake system as claimed in claim 9, wherein said vehicle speed estimating means is arranged to set the previous vehicle speed as a current vehicle speed when the number of the locked wheels detected by said locked-wheel detecting means is four.

12. The anti-skid brake system as claimed in claim 1, further comprising:

a control threshold value setting means for setting a control threshold value on the basis of the ground friction coefficient $\mu$ estimated by said ground friction coefficient estimating means;

wherein said anti-skid control means controls said braking force adjusting means on the basis of the control threshold value set by said control threshold value setting means.

13. The anti-skid brake system as claimed in claim 12, wherein said control threshold value is set for shifting three states comprising a state of increasing the braking force, a state of decreasing the braking force, and a state of retaining the braking force.

14. The anti-skid brake system as claimed in claim 13, wherein:

said control threshold value comprises:

a first threshold value for shifting from the state of increasing the braking force to the state of retaining the braking force at a level to which the braking force is increased;

a second threshold value for shifting from the state of retaining the braking force to the state of decreasing the braking force;

a third threshold value for shifting from the state of decreasing the braking force to the state of retaining the braking force at a level to which the braking force is decreased; and a fourth threshold value for shifting from the state of retaining the braking force to the state of increasing the braking force.

15. The anti-skid brake system as claimed in claim 14, wherein:

said first threshold value and said third threshold value are set each as a change rate of the wheel speed or as deceleration of the wheel speed; and said second threshold value and said fourth threshold value are each set as a slip value indicative of the tendency of locking the wheel.

16. The anti-skid brake system as claimed in claim 15, wherein said slip value is determined as a rate of the wheel speed to the vehicle speed.

17. The anti-skid brake system as claimed in claim 12, wherein said control threshold value is set on the basis of the ground friction coefficient $\mu$ and the vehicle speed as parameters.

18. The anti-skid brake system as claimed in claim 12, wherein said control threshold value is corrected in accordance with a steered angle of a steering wheel.

19. The anti-skid brake system as claimed in claim 12, wherein said control threshold value is corrected in accordance with an extent of roughness on slippery ground.

20. The anti-skid brake system as claimed in claim 4, wherein said locked-wheel detecting means is arranged to detect the number of locked wheels based on a deviation between the wheel speeds detected by said at least one wheel speed detecting means and the vehicle speed estimated by said vehicle speed estimating means.

21. The anti-skid brake system as claimed in claim 1, wherein said braking force adjusting means comprises a braking oil force adjusting means.

22. The anti-skid brake system as claimed in claim 1, wherein said braking force adjusting means adjusts the breaking force by adjusting a braking oil pressure.

23. An anti-skid brake system for an automotive vehicle having:
- a wheel speed detecting means for detecting a rotational speed of each of a plurality of wheels independently from each other;
- a ground friction coefficient estimating means for estimating a ground friction coefficient $\mu$ based on a change rate of the vehicle speed computed from the wheel speeds detected by said wheel speed detecting means;
- a braking force adjusting means for adjusting a braking force applied to each wheel; and
- an anti-skid control means for controlling said braking force adjusting means based on the wheel speeds detected by said wheel speed detecting means and the ground friction coefficient estimated by said ground friction coefficient estimating means;

further comprising:
- a locked wheel detecting means for detecting a number of locked wheels having a slip value equal to or greater than a predetermined value, in response to output from said wheel speed detecting means; and
- an estimation process altering means for altering an estimation process for estimating the ground friction coefficient $\mu$ by said ground friction coefficient estimating means in accordance with the number of the locked wheels detected by said locked wheel detecting means.

24. An anti-skid brake system for an automotive vehicle comprising:
- at least one wheel speed detecting means for detecting a wheel speed of each of a plurality of wheels;
- a braking force adjusting means for adjusting a braking force applied to each wheel;
- a vehicle speed estimating means for estimating a vehicle speed of the vehicle based on the wheel speed detected by said at least one wheel speed detecting means;
- a change rate determining means for determining a change rate of the vehicle speed based on the vehicle speed estimated by said vehicle speed estimating means;
- a locked-wheel detecting means for detecting a number of locked wheels based on the wheel speeds detected by said at least one wheel speed detecting means and the vehicle speed estimated by said vehicle speed estimating means;
- a ground friction coefficient estimating means for estimating a ground friction coefficient $\mu$ based on the change rate of the vehicle speed determined by said change rate determining means;
- a control threshold value deciding means for deciding a control threshold value in accordance with the ground friction coefficient $\mu$ estimated by said ground friction coefficient estimating means;
- a braking force controlling means for controlling said braking force adjusting means to prevent the wheels from being locked, by utilizing the control threshold value decided by said control threshold value deciding means; and
- an estimation process altering means for altering an estimation process for estimating the ground friction coefficient $\mu$ by said ground friction coefficient estimating means in accordance with the number of the locked wheels detected by said locked wheel detecting means, when the number of the locked wheels detected by said locked-wheel detecting means is two or less.

25. The anti-skid brake system as claimed in claim 24, wherein:
- when said locked-wheel detecting means detects four locked wheels, consisting of left and right front wheels and left and right rear wheels,
- said vehicle speed estimating means estimates the current vehicle speed to be a previously decided.

26. The anti-skid brake system as claimed in claim 25, wherein said vehicle speed estimating means decides the wheel speed of a non-locked wheel as a wheel speed when the number of the locked wheels detected by said locked-wheel detecting means is three.

27. The anti-skid brake system as claimed in 24, wherein said estimation process altering means alters the estimation process for estimating the ground friction coefficient $\mu$ such that the ground friction coefficient $\mu$ is more likely to shift to a low ground friction side when (i) the number of the locked wheels detected by said locked-wheel detecting means is two, as compared with when (ii) the number of the locked wheels detected by said locked wheel detecting means is less than two.

28. The anti-skid brake system as claimed in claim 24, wherein said estimation process altering means alters the estimation process for estimating the ground friction coefficient $\mu$ such that the ground friction coefficient $\mu$ is less likely to shift to a high ground friction side when (i) the number of locked wheels detected by said locked-wheel detecting means is two, as compared with when (ii) the number of locked wheels detected by said locked wheel detecting means is less than two.

29. The anti-skid brake system as claimed in any one of claims 24 to 28, further comprising:
- a slip value determining means for determining a slip value of the wheels based on the wheel speeds detected by said at least one wheel speed detecting means and the vehicle speed estimated by said vehicle speed estimating means;
- wherein a control state for controlling said braking force adjusting means by said control means is set as a first control state in which the braking force is increased, a second control state in which the braking force is decreased, and a third control state in which the braking force is retained at its current level;
- wherein said control threshold value comprises a first threshold value for shifting from the first control state to the third control state, a second threshold value for shifting from the third control state to the second control state, a third threshold value for shifting from the second control state to the third control state, and a fourth threshold value for shifting the third control state to the first control state;
- wherein each of the first and third threshold values is set as a change rate of the wheel speeds; and
- wherein each of the second and fourth threshold values is set as a slip value of the wheels.

30. An anti-skid brake system having:
- at least one wheel speed sensor for detecting a rotational speed of each of a plurality of wheels separately;

a braking force adjusting mechanism for adjusting a braking force applied to each wheel; and a control unit for controlling said braking force adjusting mechanism so as to prevent the wheels from locking, in response to an output from said at least one wheel speed sensor;

wherein said control unit comprises:

a ground friction coefficient estimating section for estimating a ground friction coefficient μ based on a change rate of signals relating to the wheel speeds detected by said at least one wheel speed sensor;

a control section for controlling said braking force adjusting mechanism in accordance with the ground friction coefficient μ estimated by said ground friction coefficient estimating section;

a locked wheel detecting section for detecting a number of locked wheels at least on the basis of the wheel speeds detected by said at least one wheel speed sensor; and an estimation process altering section for altering an estimation process for estimating the ground friction coefficient μ by said ground friction coefficient estimating section in accordance with the number of the locked wheels detected by said locked wheel detecting section.

31. The anti-skid brake system as claimed in claim 30, wherein said estimation process altering section for altering an estimation process for estimating the ground friction coefficient μ by said ground friction coefficient estimating section such that the ground friction coefficient μ is more likely to shift to a low ground friction side when (i) the number of the locked wheels detected by said locked wheel detecting section is two than when (ii) the number of the locked wheels detected by said locked wheel detecting section is less than two.

32. The anti-skid brake system as claimed in claim 30, wherein said estimation process altering section for altering an estimation process for estimating the ground friction coefficient μ by said ground friction coefficient estimating section such that the ground friction coefficient μ is less likely to shift to a high ground friction side when (i) the number of locked wheels detected by said locked wheel detecting section is two than when (ii) the number of locked wheels detected by said locked wheel detecting section is less than two.

33. An anti-skid brake system having:

at least one wheel speed sensor for detecting a rotational speed of each of a plurality of wheels separately;

a braking force adjusting mechanism for adjusting a braking force applied to each wheel; and a control unit for controlling said braking force adjusting mechanism to prevent the wheel from locking, in response to an output from said at least one wheel speed sensor;

wherein said control unit comprises:

a ground friction coefficient estimating section for estimating a ground friction coefficient μ based on the wheel speeds detected by said at least one wheel speed sensor and a change rate of the vehicle speed determined from the wheel speeds detected by said at least one wheel speed sensor;

a control section for controlling said braking force adjusting mechanism based on the wheel speeds detected by said at least one wheel speed sensor and the ground friction coefficient estimated by said ground friction coefficient μ estimating section;

a locked wheel detecting section for detecting a number of locked wheels having a slip value equal to or greater than a predetermined value based on the wheel speeds detected by said at least one wheel speed sensor; and an estimation process altering section for altering an estimation process for estimating the ground friction coefficient μ by said ground friction coefficient estimating section in accordance with the number of locked wheels detected by said locked wheel detecting section.

34. An anti-skid brake system having:

at least one wheel speed sensor for separately detecting a wheel speed of each of a plurality of wheels of a vehicle;

a braking force adjusting mechanism for adjusting a braking force applied to each wheel; and a control unit for controlling said braking force adjusting mechanism to prevent the wheels from locking, in response to an output from said at least one wheel speed sensor;

wherein said control unit comprises:

a vehicle speed estimating section for estimating a vehicle speed of the vehicle based on the wheel speeds detected by said at least one wheel speed sensor;

a change rate determining section for determining a change rate of the vehicle speed based on the vehicle speed estimated by said vehicle speed estimating section;

a locked-wheel detecting section for detecting a number of locked wheels based on the wheel speeds detected by said at least one wheel speed sensor and the vehicle speed estimated by said vehicle speed estimating section;

a ground friction coefficient estimating section for estimating a ground friction coefficient μ based on the change rate of the vehicle speed determined by said change rate determining section;

a control threshold value deciding section for deciding a control threshold value in accordance with the ground friction coefficient μ estimated by said ground friction coefficient estimating section;

a braking force controlling section for controlling said braking force adjusting mechanism to prevent the wheels from being locked, by utilizing the control threshold value decided by said control threshold value deciding section; and an estimation process altering section for altering an estimation process for estimating the ground friction coefficient μ by said ground friction coefficient estimating section in accordance with the number of locked wheels detected by said locked wheel detecting section, when the number of locked wheels detected by said locked-wheel detecting section is two or less.

35. The anti-skid brake system as claimed in claim 34, wherein:

when said locked-wheel detecting means detects four locked wheels, consisting of left and right front wheels and left and right rear wheels, said vehicle speed estimating section estimates a current vehicle speed to be a previously estimated vehicle speed.

36. The anti-skid brake system as claimed in claim 34, wherein said vehicle speed estimating section decides the wheel speed of a non-locked wheel as a wheel speed when the number of locked wheels detected by said locked wheel detecting section is three.

37. The anti-skid brake system as claimed in claim 34, wherein said estimation process altering section alters the estimation process for estimating the ground friction coefficient μ such that the ground friction coefficient μ is more likely to shift to a low ground friction side when (i) the number of locked wheels detected by said locked wheel detecting section is two, as compared with when (ii) the number of locked wheels detected by said locked wheel detecting section is less than two.

38. The anti-skid brake system as claimed in claim 34, wherein said estimation process altering section alters the estimation process for estimating the ground friction coefficient μ such that the ground friction coefficient μ is less likely to shift to a high ground friction side when (i) the number of locked wheels detected by said locked wheel detecting section is two, as compared with when (ii) the number of locked wheels detected by said locked wheel detecting section is less than two.

\* \* \* \* \*